(12) United States Patent
Yoshimoto

(10) Patent No.: US 11,027,826 B2
(45) Date of Patent: Jun. 8, 2021

(54) AIRCRAFT

(71) Applicant: MITSUBISHI HEAVY INDUSTRIES, LTD., Tokyo (JP)

(72) Inventor: Minoru Yoshimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 442 days.

(21) Appl. No.: 16/110,519

(22) Filed: Aug. 23, 2018

(65) Prior Publication Data

US 2019/0061920 A1 Feb. 28, 2019

(30) Foreign Application Priority Data

Aug. 25, 2017 (JP) .............................. JP2017-162493

(51) Int. Cl.
*B64C 21/04* (2006.01)
*B64D 1/04* (2006.01)
(52) U.S. Cl.
CPC ................ *B64C 21/04* (2013.01); *B64D 1/04* (2013.01); *B64C 2230/04* (2013.01)
(58) Field of Classification Search
CPC ..... B64C 21/02; B64C 21/04; B64C 2230/04; B64D 1/04
USPC ........................................................ 244/136
See application file for complete search history.

(56) References Cited

U.S. PATENT DOCUMENTS

| | | | | | |
|---|---|---|---|---|---|
| 2,749,064 | A | * | 6/1956 | Kuhlman, Jr. ........... | B64D 1/06 244/137.1 |
| 2,791,387 | A | * | 5/1957 | Weinberg ................. | B64D 1/04 244/137.1 |
| 2,954,949 | A | * | 10/1960 | Smith ....................... | B64D 1/04 244/137.1 |
| 3,934,846 | A | * | 1/1976 | Maurer ..................... | B64D 1/04 244/130 |
| 4,448,373 | A | * | 5/1984 | Bates ........................ | B64D 7/08 244/137.4 |
| 5,018,688 | A | * | 5/1991 | Stallings, Jr. ........... | B64C 23/00 244/137.4 |
| 5,069,397 | A | * | 12/1991 | Haslund .................. | B64C 21/04 244/1 R |
| 5,340,054 | A | * | 8/1994 | Smith ..................... | B64C 23/06 244/1 N |

(Continued)

FOREIGN PATENT DOCUMENTS

| | | |
|---|---|---|
| DE | 3446452 | 7/1986 |
| EP | 1752376 A2 * | 2/2007 ............... B64D 1/04 |

(Continued)

OTHER PUBLICATIONS

Notice of Reasons for Refusal dated Jan. 7, 2020 in corresponding Japanese Patent Application No. 2017-162493, with English Translation.

*Primary Examiner* — Christopher P Ellis

(74) *Attorney, Agent, or Firm* — Wenderoth, Lind & Ponack, L.L.P.

(57) ABSTRACT

An aircraft configured to drop an object includes a body, a cavity defined in the body and opening on a bottom face of the body, and a gas supply part configured to blow gas from vertically above to a blowing position on the object which is detachably mounted in the cavity. The blowing position is a position on a side closer to a nose of the aircraft with respect to a center of gravity of the object.

4 Claims, 11 Drawing Sheets

(56) References Cited

U.S. PATENT DOCUMENTS

| | | | | |
|---|---|---|---|---|
| 5,699,981 | A * | 12/1997 | McGrath | B64C 23/005 244/1 N |
| 5,988,567 | A * | 11/1999 | Wille | B64D 7/00 244/118.1 |
| 6,050,527 | A * | 4/2000 | Hebert | B64D 33/02 244/210 |
| 6,098,925 | A * | 8/2000 | Burdsall, II | B64C 23/06 244/118.1 |
| 6,206,326 | B1 * | 3/2001 | Stanek | B64D 1/06 244/118.1 |
| 6,446,904 | B1 * | 9/2002 | Stanek | B64D 7/00 244/1 N |
| 6,739,554 | B1 * | 5/2004 | Stanek | F15D 1/009 244/137.1 |
| 8,016,246 | B2 | 9/2011 | Schwimley et al. | |
| 8,382,043 | B1 * | 2/2013 | Raghu | B64C 21/04 244/207 |
| 8,439,061 | B2 | 5/2013 | Baumann | |
| 9,493,233 | B2 * | 11/2016 | Patience | B64C 23/005 |
| 9,611,050 | B2 * | 4/2017 | Tretow | B64D 33/02 |
| 9,975,635 | B2 * | 5/2018 | Taylor | B64D 1/10 |
| 10,823,055 | B2 * | 11/2020 | Joshi | F02C 6/08 |
| 10,823,207 | B2 * | 11/2020 | Cohen | B64C 23/00 |
| 2008/0290218 | A1 | 11/2008 | Schwimley et al. | |
| 2008/0315043 | A1 * | 12/2008 | Baumann | B64D 13/02 244/53 B |
| 2010/0012767 | A1 * | 1/2010 | Demchenko | B64D 1/04 244/13 |
| 2016/0121996 | A1 | 5/2016 | Eveker et al. | |
| 2019/0136881 | A1 * | 5/2019 | Amitay | B64C 21/04 |
| 2020/0158467 | A1 * | 5/2020 | Zatterqvist | F41F 7/00 |

FOREIGN PATENT DOCUMENTS

| | | | | |
|---|---|---|---|---|
| EP | 3431762 A1 * | 1/2019 | | F04B 45/047 |
| GB | 2350402 A * | 11/2000 | | F15B 15/221 |
| JP | 03-287495 | 12/1991 | | |
| JP | 03-292297 | 12/1991 | | |
| JP | 2008-290711 | 12/2008 | | |
| JP | 2009-514732 | 4/2009 | | |
| JP | 4982846 | 5/2012 | | |

* cited by examiner

COMPARATIVE EXAMPLE

COMPARATIVE EXAMPLE

EXAMPLE

COMPARATIVE EXAMPLE

EXAMPLE

AIRCRAFT

CROSS-REFERENCE TO RELATED APPLICATIONS

The present application claims priority to and incorporates by reference the entire contents of Japanese Patent Application No. 2017-162493 filed in Japan on Aug. 25, 2017.

FIELD

The present invention relates to an aircraft.

BACKGROUND

Some aircraft may drop an object to be dropped while flying. This object to be dropped may be housed in a cavity (a bay) provided on a bottom face of an aircraft. This cavity is covered with an opening and closing door during normal times and is exposed to the outside by opening of the opening and closing door when the object to be dropped is dropped. With the cavity exposed to the outside, the object to be dropped is dropped.

In this process, because the aircraft is flying, an airflow is produced along the bottom surface of the aircraft. When the cavity is exposed to the outside, this airflow flows along the vicinity of the entrance of the cavity. The airflow flows near the cavity, whereby the pressure and flow velocity of air near the cavity may be disturbed. Japanese Patent No. 4982846 discloses a structure in which, to suppress cavity pressure fluctuations and the like caused by the airflow, the shape of the cavity is devices and a wall along the airflow is provided, for example.

Incidentally, part of the airflow flowing along the vicinity of the entrance of the cavity enters the inside of the cavity and causes a shear layer. This shear layer may collide with an end face on the downstream side of the airflow of the cavity, cause acoustic vibrations, and give excessive vibrations of structural members. The airflow flowing near the entrance of the cavity may make the region on the downstream side of the air flow in the cavity a high-pressure region. When the region on the downstream side in the cavity increases in pressure, a force pressing vertically downward along the tail side (the side near the high-pressure region on the downstream side) of the object to be dropped is exerted on the object to be dropped. Consequently, when the object to be dropped is detached from the aircraft to be dropped, a moment pressing down the tail of the object and pushing up the head of the object is exerted on the object to be dropped, and the object to be dropped takes an attitude in which the head rises up relative to the tail. With such an attitude, an outside airflow or the airflow near the entrance of the cavity causes an upward air force on the object to be dropped, and the object to be dropped may collide with an airframe and damage the airframe and the object to be dropped. The structure in Japanese Patent No. 4982846 cannot necessarily suppress such vibrations of the structural members by the shear layer hitting the end face on the downstream side of the cavity and damage caused due to collision of the object to be dropped with the airframe; therefore, it is required that both vibrations of the structural members and damage caused due to collision of the object to be dropped with the airframe are suppressed.

SUMMARY

An aircraft according to the present disclosure is configured to drop an object to be dropped. The aircraft includes a body, a cavity that is provided in the body and opens on a bottom face of the body, and a gas supply part configured to blow gas from vertically above to a blowing position on the object to be dropped detachably mounted in the cavity. The blowing position is a position on a side closer to a nose of the aircraft with respect to the center of gravity of the object to be dropped.

DETAILED DESCRIPTION

The following describes a preferred embodiment of the present invention in detail with reference to the accompanying drawings. The present invention is not limited by this embodiment. When there are a plurality of embodiments, the present invention also includes a combination of the embodiments.

Figure 1:
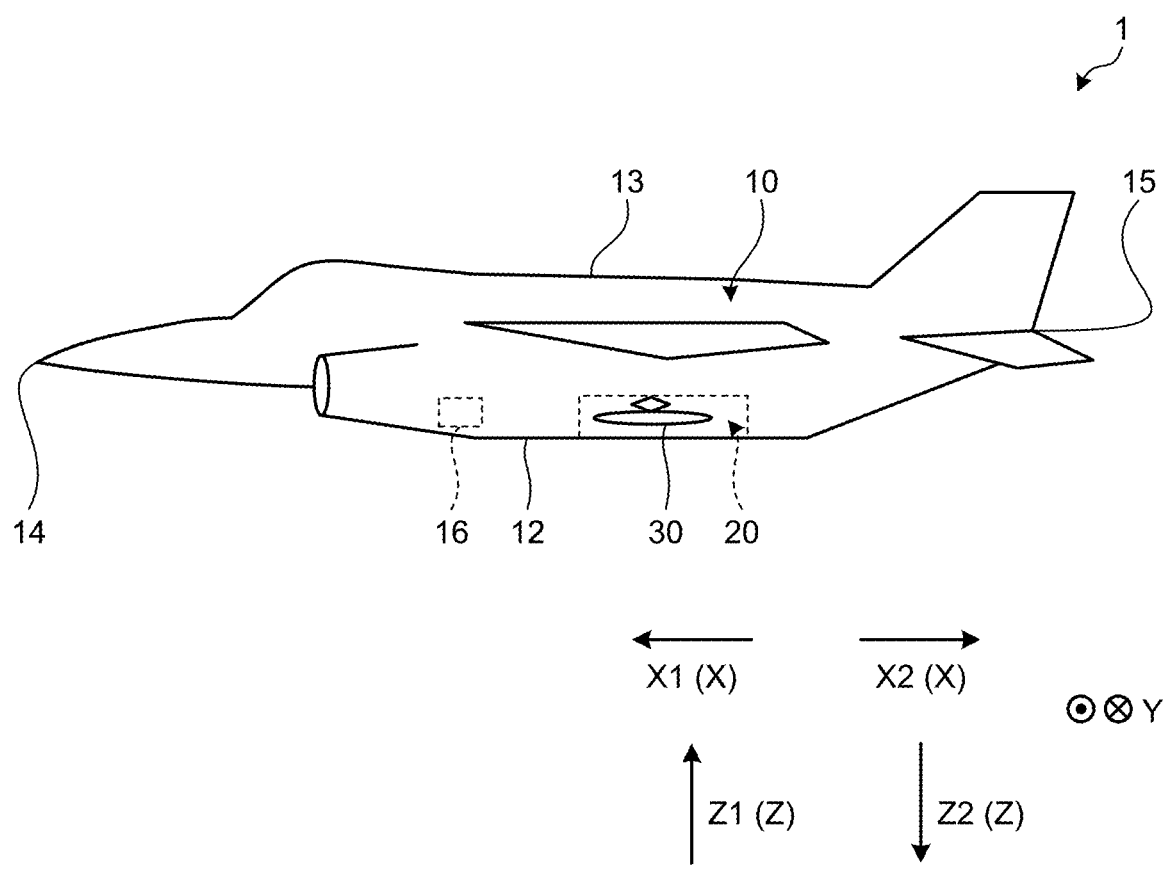
FIG. 1 is a schematic diagram of an aircraft according to the present embodiment.

FIG. 1 is a schematic diagram of an aircraft according to the present embodiment. As illustrated in FIG. 1, this aircraft 1 according to the present embodiment has a body 10. The body 10 is the fuselage of the aircraft 1 and includes a cavity 20 therein. It should be noted that the body 10 is not limited to the fuselage as long as it includes the cavity 20 therein and may be a main wing, for example. The cavity 20 is a space provided in the body 10 and opens at the bottom face 12 of the body 10. The cavity 20 includes an object to be dropped 30 therein. The object to be dropped 30 is an object to be dropped from the aircraft 1. The bottom face 12 is a face on the side opposite to a top face 13 of the body 10. When the aircraft 1 is placed on the ground or is horizontally flying, the top face 13 is a surface on the vertically upper side of the body 10, whereas the bottom face 12 is a surface on the vertically lower side of the body 10.

In the following, a direction directed from a tail 15 of the aircraft 1 toward a nose 14 is defined as the direction X1, whereas a direction directed from the nose 14 of the aircraft 1 toward the tail 15 is defined as the direction X2. The direction X1 is the travel direction of the aircraft 1, whereas the direction X2 is a direction opposite the direction X1. When the direction X1 and the direction X2 are not distinguished from each other, they are denoted by the direction X. The direction X is along a roll axis. A direction directed from the bottom face 12 toward the top face 13 is defined as the direction Z1, whereas a direction directed from the top face 13 toward the bottom face 12 is defined as the direction Z2. When the aircraft 1 is horizontally flying, the direction Z1 is a direction directed vertically upward (a direction departing from the surface of the earth), whereas the direction Z2 is a direction directed vertically downward (a direction approaching the surface of the earth). When the direction Z1 and the direction Z2 are not distinguished from each other, they are denoted by the direction Z. The direction Z is along a yaw axis. The direction Z is orthogonal to the direction X. A direction orthogonal to the direction X and the direction Z is defined as the direction Y. The direction Y is along a pitch axis.

Figure 2:
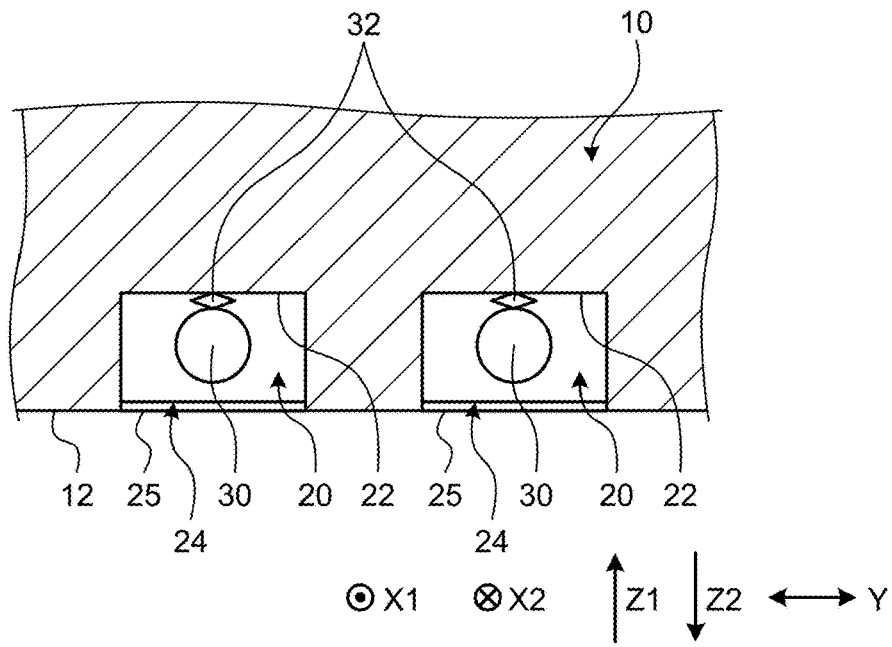
FIG. 2 is a schematic diagram illustrating the dropping of objects to be dropped.
Figure 3:
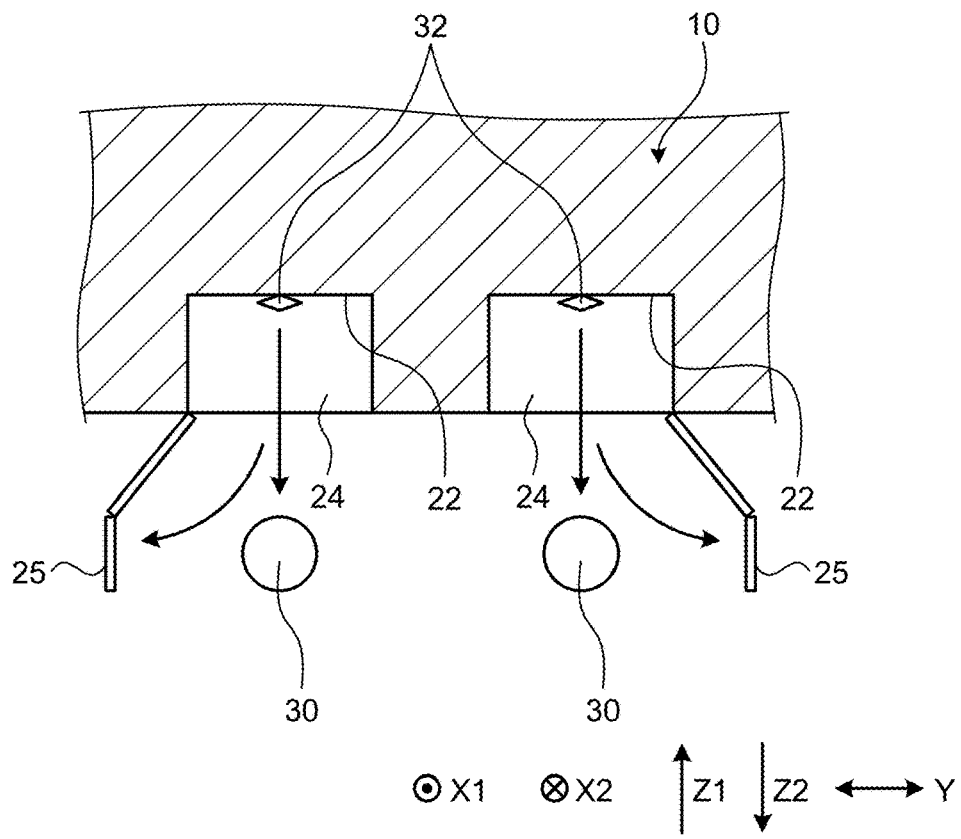
FIG. 3 is a schematic diagram illustrating the dropping of the objects to be dropped.

A controller 16 is provided in the body 10. The controller 16 causes the object to be dropped 30 to be dropped from the cavity 20 by the pilot's operation, for example. FIG. 2 and FIG. 3 are schematic diagrams illustrating the dropping of objects to be dropped. FIG. 2 and FIG. 3 are schematic sectional views when the body 10 is viewed in the direction X.

As illustrated in FIG. 2, in the present embodiment, a plurality of (two in the example in FIG. 2) cavities 20 are provided in the body 10. The cavities 20 are each an opening (a recess) passing through from the bottom face 12 of the body 10 to a bottom face 22 provided in the body 10. An opening and closing door 25 and a support part 32 are mounted on the cavity 20. The opening and closing door 25 is provided on an opening 24 of the body 10. The opening 24 is an opening on the bottom face 12 side of the cavity 20. The opening and closing door 25 opens and closes by rotating with the direction X as the axis of rotation. The opening and closing door 25 switches the cavity 20 between a closed state and an open state by opening and closing. FIG. 2 illustrates the closed state. As illustrated in FIG. 2, in the closed state, the opening 24 is covered with the opening and closing door 25, and the cavity 20 is not exposed to the outside. FIG. 3 illustrates the open state. As illustrated in FIG. 3, in the cavity 20 in the open state, the opening and closing door 25 opens, whereby the opening 24 is not covered with the opening and closing door 25. The cavity 20 in the open state is exposed to the outside. The support part 32 is mounted on the bottom face 22 of the cavity 20. The support part 32 supports the object to be dropped 30 in a detachable manner. The object to be dropped 30 is supported at the support part 32 with its major axis direction along the direction X. The center of gravity of the object to be dropped 30 is supported at the support part 32.

As illustrated in FIG. 2, when the object to be dropped 30 is not dropped, the aircraft 1 closes the opening and closing door 25 under the control of the controller 16 to close the cavity 20. The aircraft 1 supports (fixes) the object to be dropped 30 at the support part 32. In other words, when the object to be dropped 30 is not dropped, the cavity 20 is not exposed to the outside, and the object to be dropped 30 is held in the cavity 20. In contrast, when the object to be dropped 30 is dropped as illustrated in FIG. 3, the aircraft 1 opens the opening and closing door 25 under the control of the controller 16 to open the cavity 20. After that, the aircraft 1 detaches the object to be dropped 30 from the support part 32 under the control of the controller 16. When the object to be dropped 30 is dropped, the aircraft 1 is in a state with the bottom face 12 directed vertically downward, and the object to be dropped 30 is detached from the support part 32 to be dropped from the inside of the cavity 20 to the outside of the cavity 20 (moves in the direction Z2) by gravity. When detaching the object to be dropped 30, the support part 32 may exert a force on the object to be dropped 30 in the direction Z2. In this case, the object to be dropped 30 is dropped from the inside of the cavity 20 to the outside of the cavity 20 by this force from the support part 32 and gravity. The object to be dropped 30 may be dropped to the surface of the earth by gravity as it is or be directed toward a destination under the control of the controller 16.

Thus, when the object to be dropped 30 is dropped, the opening and closing door 25 is opened to expose the cavity 20 to the outside. In this case, an airflow flowing near the bottom face 12 may cause an imbalance in pressure distribution near the cavity 20 and cause acoustic vibrations and a collision of the object to be dropped 30 with an airframe. The following describes mechanisms of acoustic vibrations and the collision of the object to be dropped 30 with the airframe with reference to a comparative example.

Figure 4:
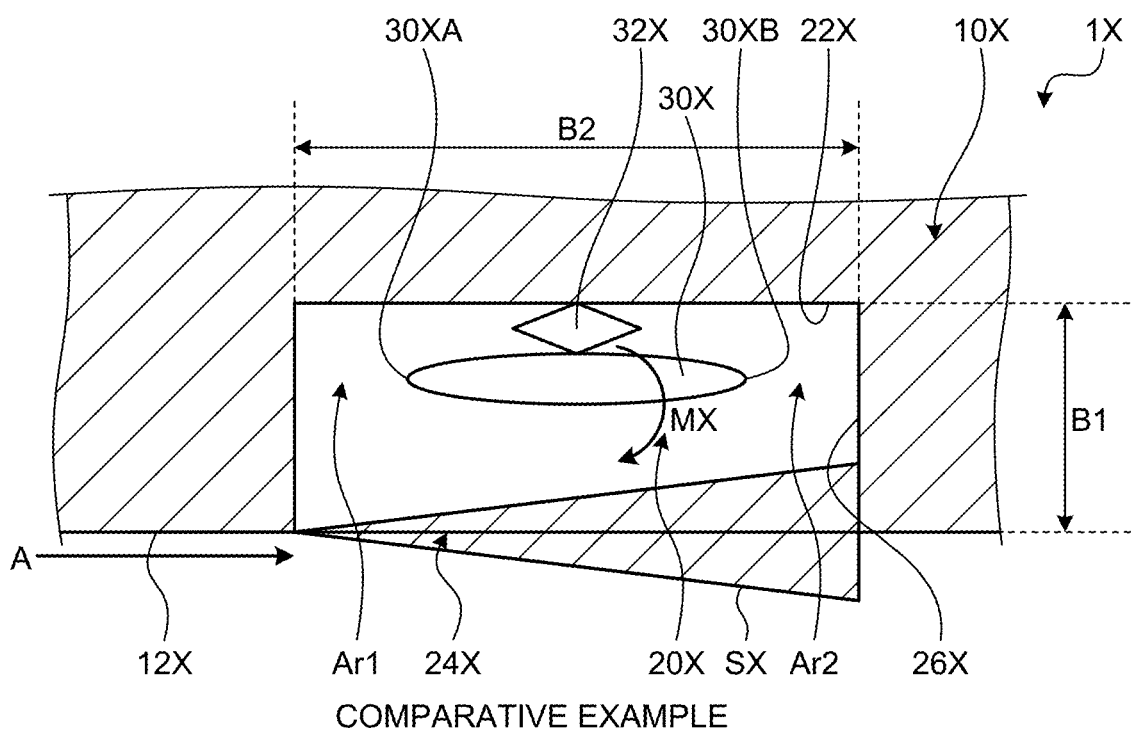
FIG. 4 is a schematic diagram illustrating an airflow occurring in a comparative example.
Figure 4:
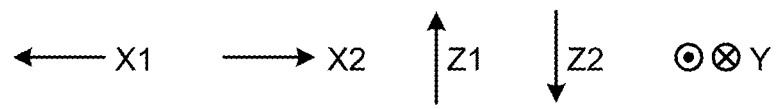

FIG. 4 is a schematic diagram illustrating an airflow occurring in the comparative example. This aircraft 1X according to the comparative example has a cavity 20X provided in a body 10X and an opening in a bottom face 12X similarly to the present embodiment. However, the aircraft 1X does not have a gas supply part that is described below. As illustrated in FIG. 4, when an object to be dropped 30X is dropped, the aircraft 1X is flying in the direction X1. Consequently, an airflow A occurs in the aircraft 1X along the bottom face 12X. The airflow A is an airflow flowing in the direction X2 relative to the aircraft 1X along the bottom face 12X. When the object to be dropped 30X is dropped, in the cavity 20X, an opening 24X is exposed to the outside. Consequently, when an airflow A is flowing along the opening 24X, part of the airflow A enters the inside of the cavity 20X to cause a shear layer SX. In other words, the shear layer SX is an airflow flowing in the direction X2 along the opening 24X, and part of it enters the cavity 20X. Consequently, the shear layer SX collides with a rear end face 26X of the cavity 20X. The rear end face 26X is a face on the direction X2 side of the cavity 20X. The shear layer SX collides with the rear end face 26X to cause reflected waves in the direction X1. The shear layer SX and the reflected waves cause acoustic vibrations, that is, vibrations of the structural members of the aircraft 1X.

This shear layer SX causes an imbalance in pressure distribution in the cavity 20X. In other words, in the cavity 20X, an area Ar1 is a low-pressure area, whereas an area Ar2 is a high-pressure area. The area Ar1 is an area near a bottom face 22X of the cavity 20X, the area being on the direction X1 side. The area Ar2 is an area near the bottom face 22X of the cavity 20X, the area being on the direction X2 side. The object to be dropped 30X in the cavity 20X receives a force in a direction in which a tail end part 30XB as an end part on the direction X2 side is pushed in the direction Z2 (vertically downward) by the high pressure of the area Ar2. Consequently, the object to be dropped 30X receives a moment in the direction MX. The direction MX is a rotational direction in which the tail end part 30XB of the object to be dropped 30X moves in the direction Z2 (vertically downward) and is a clockwise direction in the example in FIG. 4. Consequently, when the object to be dropped 30X is detached from a support part 32X, a head part 30XA of the object to be dropped 30X is lifted in the direction Z1 (vertically upward) by the moment in the direction MX and collides with the bottom face 22X of the cavity 20X or the bottom face 12X and the like (the airframe of the aircraft 1X) after being dropped, which may cause damage to the aircraft 1X and the object to be dropped 30X. The head part 30XA is an end part on the direction X1 side of the object to be dropped 30X.

Now, let the depth of the cavity 20X, that is, the length from the opening 24X to the bottom face 22X in the direction Z be Length B1. Let the distance of the cavity 20X in the direction X be Length B2. In this case, when the ratio of Length B2 to Length B1 is large, acoustic vibrations are suppressed, but the risk of damage due to collision of the head part 30XA of the object to be dropped 30X increases. In contrast, when the ratio of Length B2 to Length B1 is small, the risk of damage due to collision of the head part 30XA decreases, but acoustic vibrations are increased. Depending on the ratio between Length B1 and Length B2, both acoustic vibrations and the collision of the head part 30XA may occur. Consequently, it is appropriate to suppress both acoustic vibrations and the collision of the head part 30XA. In the present embodiment, a gas supply part described below is provided to suppress both acoustic vibrations and the collision of a head part. A specific description will be given below.

Figure 5:
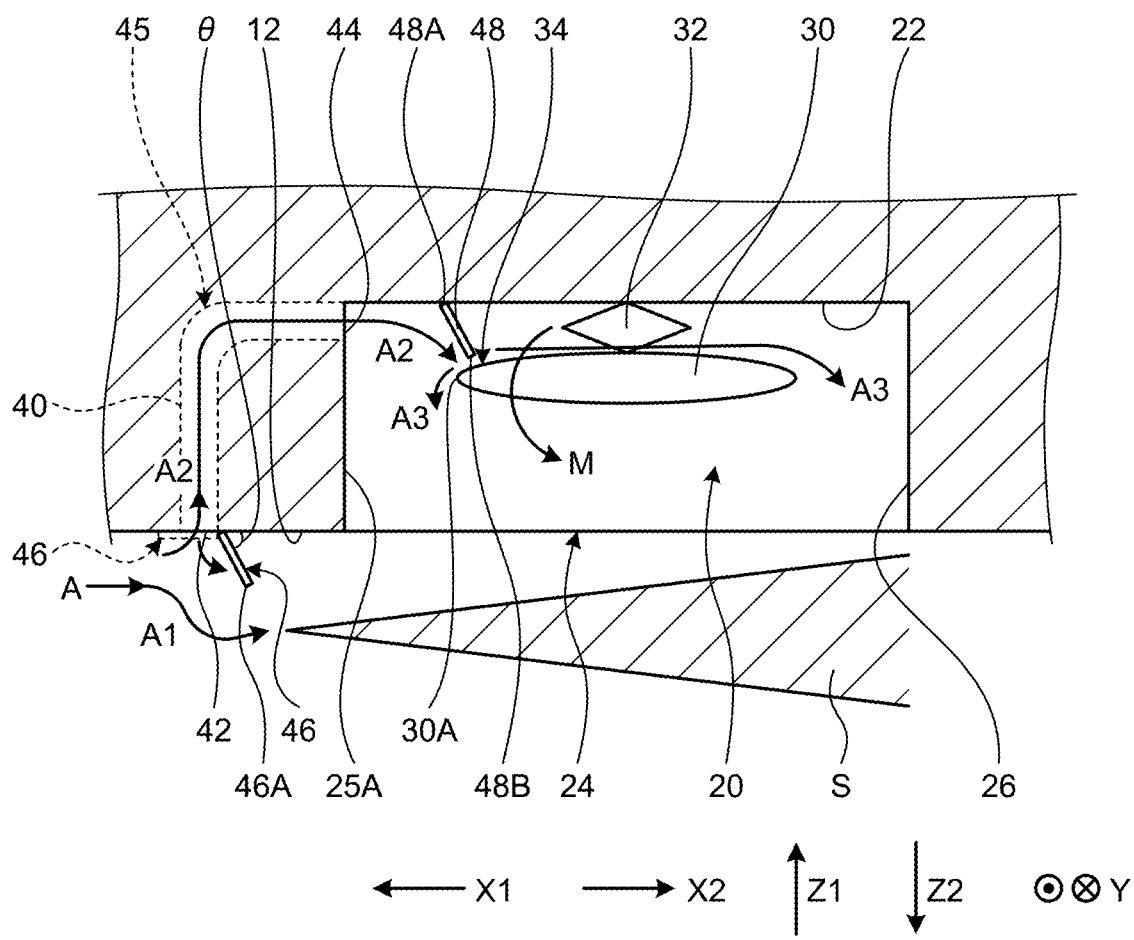
FIG. 5 is a schematic enlarged view of a cavity according to the present embodiment.
Figure 6:
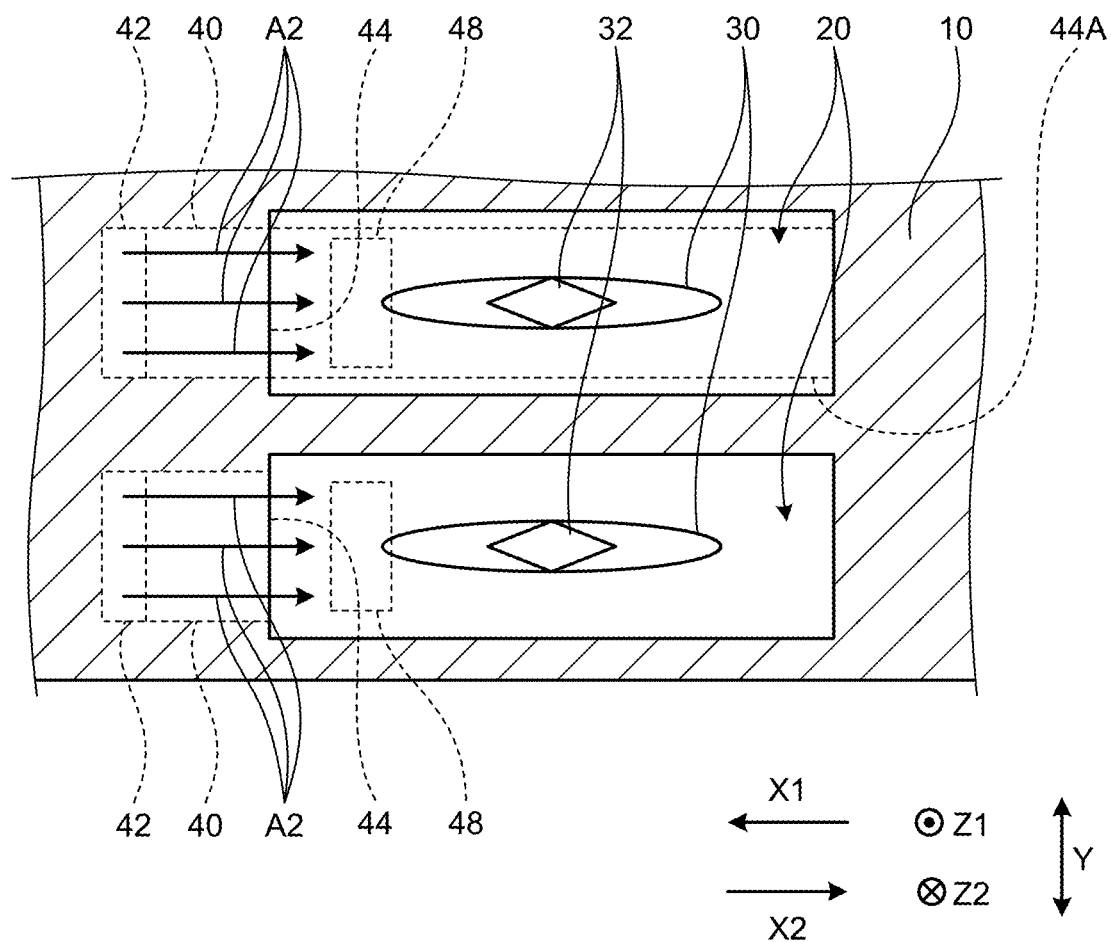
FIG. 6 is a schematic enlarged view of the cavity according to the present embodiment.

FIG. 5 and FIG. 6 are schematic enlarged views of the cavity according to the present embodiment. FIG. 5 is a sectional view of the cavity 20 viewed in the direction Y, whereas FIG. 6 is a sectional view of the cavity 20 viewed in the direction X. As illustrated in FIG. 5, the aircraft 1 according to the present embodiment has the cavity 20, the object to be dropped 30, a gas supply channel 40, an inlet wall part 46, and an outlet wall part 48. The gas supply channel 40, the inlet wall part 46, and the outlet wall part 48 form the gas supply part.

As illustrated in FIG. 5, the gas supply channel 40 is a hole (a duct) provided in the body 10 and communicates the bottom face 12 of the body 10 and the cavity 20 with each other. The gas supply channel 40 is provided with an inlet opening part 42 and an outlet opening part 44. The inlet opening part 42 is an opening provided in the bottom face 12 of the body 10. More specifically, the inlet opening part 42 opens in a side in the direction X1 (a side closer to the nose 14 of the aircraft 1) with respect to the opening 24 of the cavity 20. The outlet opening part 44 opens in a front end face 25A of the cavity 20. The front end face 25A is a face on the direction X1 side of the cavity 20. More specifically, the outlet opening part 44 opens in a side in the direction Z1 with respect to the object to be dropped 30, that is, in the vertically upper side with respect to the object to be dropped 30 when the object to be dropped 30 is dropped. The gas supply channel 40 communicates the inlet opening part 42 and the outlet opening part 44 with each other. Now, let a position midway between the inlet opening part 42 and the outlet opening part 44 of the gas supply channel 40 be a midway position 45. The gas supply channel 40 is along the direction Z from the inlet opening part 42 to the midway position 45. The gas supply channel 40 is curved at the midway position 45 in the direction X to be along the direction X from the midway position 45 to the outlet opening part 44. It should be noted that the gas supply channel 40 does not necessarily extend in such directions as long as it communicates the inlet opening part 42 and the midway position 45 with each other.

As illustrated in FIG. 6, the gas supply channel 40 is formed such that its length in the direction Y is longer than its length in the direction X or the direction Z in each cross section in correspondence with the width in the direction Y of the cavity 20. In the gas supply channel 40, its length in the direction Y is longer than its length in the direction X from the inlet opening part 42 to the midway position 45, for example. In the gas supply channel 40, its length in the direction Y is longer than its length in the direction Z from the midway position 45 to the outlet opening part 44. In the gas supply channel 40, its length in the direction Y in the outlet opening part 44 is longer than the length in the direction Y of the object to be dropped 30. The gas supply channel 40 causes a projected region 44A in the direction X of the outlet opening part 44 to be superimposed on the object to be dropped 30 and more specifically causes the object to be dropped 30 to be positioned in the projected region 44A. It should be noted that the shape of the gas supply channel 40 is not limited to the example illustrated in FIG. 6.

As illustrated in FIG. 5, the inlet wall part 46 is a plate-shaped member mounted on the inlet opening part 42. The inlet wall part 46 rotates with the direction Y as a rotational axis to open and close under the control of the controller 16 and switches the inlet opening part 42 between a closed state and an open state. The inlet wall part 46 rotates in a direction in which its surface inclines in a direction along the bottom face 12 to close (the dotted line in FIG. 5), covers the inlet opening part 42, and closes the inlet opening part 42. The inlet wall part 46 rotates in a direction in which its surface inclines in a direction crossing the bottom face 12 to open (the solid line in FIG. 5), opens the inlet opening part 42 to the outside, and opens the inlet opening part 42. The inlet wall part 46 in its open state is positioned between the inlet opening part 42 and the opening 24 of the cavity 20 in the direction X and in that position protrudes in the direction Z2 from the bottom face 12 of the body 10. The inlet wall part 46 in its open state has any angle of inclination as long as its surface inclines in the direction crossing the bottom face 12. The inlet wall part 46 does not necessarily operate so as to open and close the inlet opening part 42 as long as it is provided between the inlet opening part 42 and the opening 24 of the cavity 20 and protrudes in the direction Z2 from the bottom face 12 of the body 10. The inlet wall part 46 may be fixed between the inlet opening part 42 and the opening 24 of the cavity 20, for example. The inlet wall part 46 is not necessarily provided.

As illustrated in FIG. 5, the outlet wall part 48 is a plate-shaped member mounted on the bottom face 22 of the cavity 20 in the cavity 20. The outlet wall part 48 is provided on a side in the direction Z1 in the cavity 20 with respect to the object to be dropped 30, that is, the vertically upper side with respect to the object to be dropped 30 when the object to be dropped 30 is dropped. The outlet wall part 48 is provided on a side in the direction X1 (a side closer to the outlet opening part 44) in the cavity 20 with respect to the center of gravity of the object to be dropped 30, that is, the place supported on the support part 32. The outlet wall part 48 extends in the direction X2 from an end part 48A toward an end part 48B and inclines in the direction X2 from the end part 48A toward the end part 48B. The end part 48A is an end part of the outlet wall part 48 mounted on the bottom face 22, whereas the end part 48B is an end part on the side opposite the end part 48A. The outlet wall part 48 is fixed to the bottom face 22 of the cavity 20 and is not movable. The outlet wall part 48 is not necessarily provided.

The gas supply channel 40, the inlet wall part 46, and the outlet wall part 48 are structured as described above. The following describes an airflow near the cavity 20 in the present embodiment. As illustrated in FIG. 5, when the object to be dropped 30 is dropped, the aircraft 1 is flying in the direction X1. Consequently, the airflow A occurs along the bottom face 12 in the aircraft 1. When the object to be dropped 30 is dropped, the cavity 20 is exposed to the outside. When the object to be dropped 30 is dropped, the inlet wall part 46 opens under the control of the controller 16 to cause the inlet opening part 42 to be open (to be exposed to the outside). In this process, the object to be dropped 30 is still supported at the support part 32. When the object to be dropped 30 is not dropped, the inlet wall part 46 is closed under the control of the controller 16 to cover the inlet opening part 42.

The airflow flowing along the bottom face 12 collides with the open inlet wall part 46 and flows in the direction Z2 along the inlet wall part 46 as an airflow A. The airflow A1 that has flowed in the direction Z2 reaches a point beyond a tip 46A of the inlet wall part 46 in the direction Z2 and then flows along the opening 24 in the direction X2 from that position. This airflow A1 forms a shear layer S. The airflow A1 is pressed down in the direction Z2 by the collision with the inlet wall part 46, and thus the shear layer S is pressed down in the direction Z2 more than the shear layer SX according to the comparative example.

Part of the airflow A is taken in into the gas supply channel 40 from the open inlet opening part 42 as an airflow A2. The airflow A2 taken in into the gas supply channel 40 passes through the gas supply channel 40 to be released into the cavity 20 from the outlet opening part 44. The airflow A2 that has been released from the outlet opening part 44 collides with the outlet wall part 48, flows along the surface of the outlet wall part 48, and is blown to a blowing position 34 on the object to be dropped 30. The blowing position 34 is a position on the surface of the object to be dropped 30 to which the airflow A2 from the outlet opening part 44 is blown. The blowing position 34 is a position on the surface on the direction Z1 side (the vertically upper side) of the object to be dropped 30, the position being on a side in the direction X1 (a side closer to the nose 14 of the aircraft 1) with respect to the center of gravity of the object to be dropped 30 (the position where the object to be dropped 30 is supported by the support part 32).

The outlet opening part 44 and the outlet wall part 48 are positioned on a side in the direction Z1 with respect to the object to be dropped 30. Consequently, the airflow A2 is blown to the blowing position 34 on the object to be dropped 30 as an airflow having the direction Z2 (vertically downward) component from the direction Z1 side (vertically above). Consequently, the object to be dropped 30 in the cavity 20 receives a force in a direction in which a head part 30A is pushed in the direction Z2 (vertically downward) by the airflow A2 to receive a moment in the direction M. The head part 30A is an end part on the direction X1 side of the object to be dropped 30. The direction M is a rotational direction in which the head part 30A of the object to be dropped 30 moves in the direction Z2 (vertically downward) and is a counterclockwise direction in the example in FIG. 5. Consequently, when the object to be dropped 30 is detached from the support part 32, in the object to be dropped 30, the moment in the direction M cancels a moment in a direction in which the head part 30A is lifted in the direction Z1 (vertically upward), and the collision of the object to be dropped 30 with the bottom face 22 of the cavity 20 and the airframe of the aircraft 1 such as the bottom face 12 after being dropped is suppressed. Consequently, in the present embodiment, damage due to collision of the head part 30A with the bottom face 22 is suppressed. The blowing position 34 is preferably the head part 30A. The blowing position 34 is the head part 30A, whereby the distance from the gravity center to a point of application increases, and the moment in the direction M is increased to suppress the collision more favorably.

The airflow A2 that has hit the blowing position 34 and the airflow A2 that has not hit the blowing position 34 flow in the direction Z2 in the cavity 20 as an airflow A3. Consequently, this airflow A3 further pushes down the shear layer S flowing along the opening 24 in the direction Z2. Consequently, the shear layer S is suppressed from entering the cavity 20 and is suppressed from colliding with a rear end face 26 of the cavity 20. The rear end face 26 is an end face on the direction X2 side of the cavity 20 (the downstream side of the airflow A). Consequently, reflected waves occurring due to collision with the rear end face 26 are suppressed, and acoustic vibrations are suppressed.

Thus, in the present embodiment, the airflow A2 (gas) is blown to the blowing position 34 on the object to be dropped 30 from the direction Z1 side, whereby the moment in the direction M is exerted on the object to be dropped 30, and damage due to collision of the object to be dropped 30 with the airframe of the aircraft 1 is suppressed. While the airflow A is pressed down in the direction Z2 by the inlet wall part 46, the shear layer S is pressed down in the direction Z2 by the airflow A3, whereby acoustic vibrations are suppressed. Thus, the present embodiment can appropriately suppress both damage due to collision of the object to be dropped 30 with the airframe of the aircraft 1 and acoustic vibrations by the gas supply part (the gas supply channel 40, the inlet wall part 46, and the outlet wall part 48).

Figure 7:
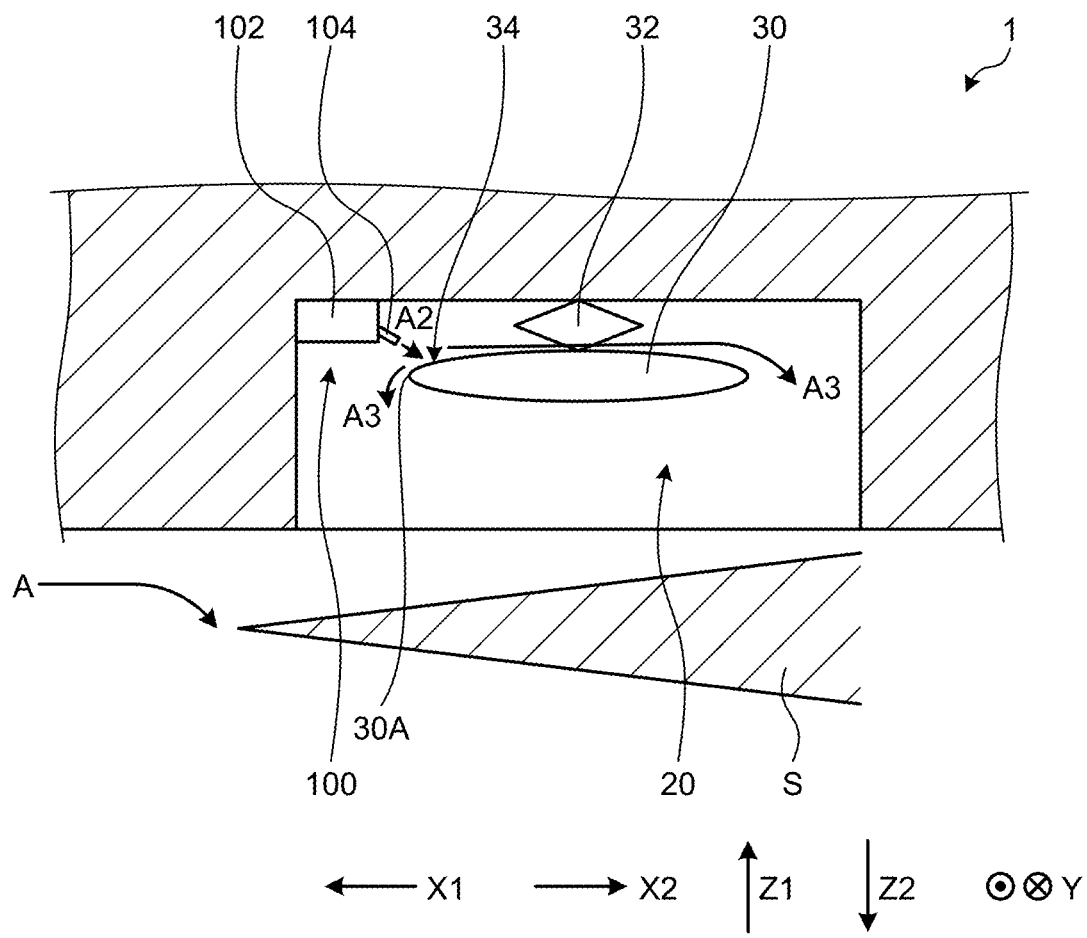
FIG. 7 is a schematic diagram of another example of a gas supply part.

In the present embodiment, the gas supply channel 40, the inlet wall part 46, and the outlet wall part 48 form the gas supply part. It should be noted that the structure of the gas supply part is not limited to the gas supply channel 40, the inlet wall part 46, and the outlet wall part 48 as long as gas can be blown to the blowing position 34 on the object to be dropped 30 in the cavity 20 from the direction Z1 side (vertically above). FIG. 7 is a schematic diagram of another example of the gas supply part. As illustrated in FIG. 7, the gas supply part may be a gas jetting apparatus 100 provided in the cavity 20, for example. The gas jetting apparatus 100 has a tank part 102 and a gas jetting part 104 and blows high-pressure gas stored in the tank part 102 from the gas jetting part 104 to the blowing position 34. Even with such a structure, the gas is blown to the blowing position 34, whereby the moment in the direction M can be exerted on the object to be dropped 30, and the gas after being blown there can press down the shear layer S in the direction Z2. Consequently, even with such a structure, both the collision of the object to be dropped 30 with the airframe of the aircraft 1 and acoustic vibrations can be appropriately suppressed. Although the gas jetting apparatus 100 is provided in the cavity 20 in the example of FIG. 7, the gas jetting apparatus 100 may be provided outside the cavity 20 in the aircraft 1, guide the gas from the gas jetting part 104 into the cavity 20 through a channel such as the gas supply channel 40, and blow the gas to the blowing position 34.

Figure 8:
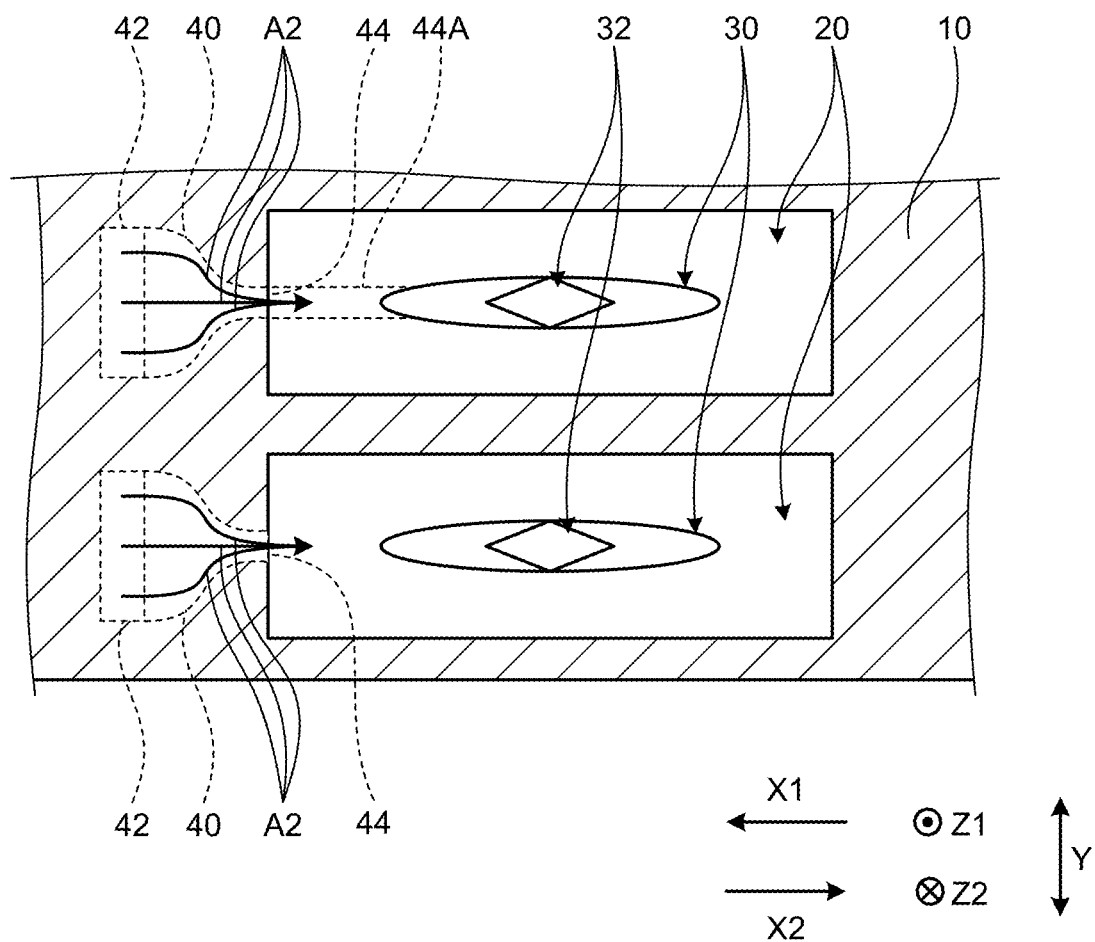
FIG. 8 is a schematic diagram of another example of a gas supply channel.

In the examples in FIG. 6, the length in the direction Y of the gas supply channel 40 is constant for each position. It should be noted that as described above the shape of the gas supply channel 40 is not limited to the example illustrated in FIG. 6. FIG. 8 is a schematic diagram of another example of the gas supply channel. As illustrated in FIG. 8, the gas supply channel 40 may be reduced in the length in the direction Y in the outlet opening part 44, for example. More specifically, in the example in FIG. 8, the length in the direction Y of the outlet opening part 44 is shorter than the length in the direction Y of the inlet opening part 42 (and the midway position 45). The length in the direction Y of the outlet opening part 44 is shorter than the length in the direction Y of the object to be dropped 30. The projected region 44A in the direction X of the outlet opening part 44 is superimposed on the object to be dropped 30. In the example in FIG. 8, the gas supply channel 40 has a smaller opening area so as to be shorter in length in the direction Y toward the outlet opening part 44.

When the shape of the gas supply channel 40 is the shape illustrated in FIG. 8, the airflow A2 passing through the gas supply channel 40 is concentratedly blown to the blowing position 34 on the object to be dropped 30 from the outlet opening part 44. Consequently, in this case, the aircraft 1 can add the moment in the direction M to the object to be dropped 30 more strongly and can suppress acoustic vibrations and the collision of the object to be dropped 30 more favorably.

As described above, the aircraft 1 according to the present embodiment is an aircraft capable of dropping the object to be dropped 30. The aircraft 1 has the body 10, the cavity 20, the object to be dropped 30, and the gas supply part. The cavity 20 is provided in the body 10 and opens at the bottom face 12 of the body 10. The object to be dropped 30 is detachably mounted in the cavity 20. To the object to be dropped 30 within the cavity 20, the gas supply part blows gas (the airflow A2) from vertically above (the direction Z1) to the blowing position 34. The blowing position 34 is a position on the object to be dropped 30, the position being on a side closer to the nose 14 of the aircraft 1 (a side in the direction X1) with respect to the center of gravity of the object to be dropped 30.

The aircraft 1 according to the present embodiment blows gas from vertically above to the blowing position 34 on the object to be dropped 30 in the cavity 20, by the gas supply part. This aircraft 1 blows the gas to the blowing position 34 to exert the moment in the direction M on the object to be dropped 30 to suppress collision of the object to be dropped 30 with the airframe of the aircraft 1 when the object to be dropped 30 is dropped. This aircraft 1 presses down the shear layer S in the direction Z2 by the gas after being blown there to suppress acoustic vibrations of the shear layer S. Consequently, this aircraft 1 can suppress both acoustic vibrations (vibrations of structural members) by the shear layer S hitting the end face on the downstream side of the cavity 20 (the rear end face 26) and damage due to collision of the object to be dropped 30 with the airframe of the aircraft 1.

When the object to be dropped 30 is dropped vertically downward (the direction Z2) from the cavity 20, that is, when the object to be dropped 30 is detached from the support part 32, the gas supply part blows an airflow having a vertically downward component (the airflow A2) onto the object to be dropped 30. By this airflow A2, this aircraft 1 makes the shear layer S depart from the airframe and is given a moment in a direction in which the head part 30A of the object to be dropped 30 is lowered relative to the tail side. Consequently, this aircraft 1 can appropriately suppress vibrations of the structural members (acoustic vibrations) by the shear layer hitting the end face on the downstream side of the cavity 20 and damage due to collision of the object to be dropped 30 with the airframe. This aircraft 1 opens the opening and closing door 25 when the object to be dropped 30 is dropped to expose the cavity 20 to the outside. Acoustic vibrations occur when the cavity 20 is exposed, and the gas is blown to the object to be dropped 30 during that time, whereby acoustic vibrations can be appropriately suppressed when acoustic vibrations may occur.

The gas supply part has the gas supply channel 40. The gas supply channel 40 has the inlet opening part 42 open in the bottom face 12 of the body 10 on a side closer to the nose 14 of the aircraft 1 (a side in the direction X1) with respect to the cavity 20. The gas supply channel 40 has the outlet opening part 44 open in the vertically upper side (a side in the direction Z1) in the cavity 20 with respect to the object to be dropped 30 in the cavity 20, and communicates the inlet opening part 42 and the outlet opening part 44 with each other. The gas supply channel 40 takes in air flowing along the bottom face 12 of the aircraft 1 (the airflow A) from the inlet opening part 42 and blows the air taken in to the blowing position 34 on the object to be dropped 30 from the outlet opening part 44. This aircraft 1 takes in part of the airflow flowing along the bottom face 12 into the gas supply channel 40, blows the airflow taken in onto the object to be dropped 30, and can thereby appropriately suppress vibrations of the structural members (acoustic vibrations) and damage due to collision of the object to be dropped 30 without separately providing an apparatus for blowing gas onto the object to be dropped 30.

The gas supply part further has the inlet wall part 46 that is provided between the inlet opening part 42 and (the opening 24 of) the cavity 20 and protrudes from the bottom face 12 of the body 10. This aircraft 1 presses down the airflow flowing along the bottom face 12 by the inlet wall part 46 and can thereby press down the shear layer S further in the direction Z2, facilitate supply of air to the gas supply part by the high pressure generated there, and suppress vibrations of the structural members (acoustic vibrations) and the collision of the object to be dropped 30 more favorably. It should be noted that the aircraft 1 can blow the airflow to the blowing position 34 on the object to be dropped 30 simply by providing the gas supply channel 40, and the inlet wall part 46 is not necessarily provided.

The inlet wall part 46 is openable and closable and covers the inlet opening part 42 when the inlet wall part 46 is closed. The inlet wall part 46 opens the inlet opening part 42 and protrudes from the bottom face 12 of the body 10 when the inlet wall part 46 is open. This inlet wall part 46 covers the inlet opening part 42 when the inlet wall part 46 is closed to suppress the airflow from entering the cavity 20 in a state in which the object to be dropped 30 is not dropped and acoustic vibrations and the collision of the object to be dropped 30 are less likely to occur. This inlet wall part 46 itself protrudes while opening the inlet opening part 42 when the inlet wall part 46 is open. Consequently, while the pressure of the upstream of the inlet wall part 46, that is, near the inlet opening part 42 is increased to appropriately take in the airflow into the cavity 20, the shear layer S can be further pressed down in the direction Z2. This aircraft 1 can close the inlet opening part 42 and cause the inlet wall part 46 not to protrude when it is not the timing for the aircraft 1 to drop the object to be dropped 30, thus a form can be achieved that does not generate useless air resistance.

The gas supply part further has the outlet wall part 48 provided in the cavity 20. The outlet wall part 48 receives the air (the airflow A2) blown out of the outlet opening part 44 and flows the received air to the blowing position 34 on the object to be dropped 30. This aircraft 1 can appropriately blow the air blown out of the outlet opening part 44 to the blowing position 34 by the outlet wall part 48 and thus can suppress vibrations of the structural members (acoustic vibrations) and the collision of the object to be dropped 30 more appropriately. It should be noted that the aircraft 1 can blow the airflow to the blowing position 34 on the object to be dropped 30 by directing the outlet opening part 44 of the gas supply channel 40 to the blowing position 34, for example, and does not necessarily have the outlet wall part 48.

Figure 9:
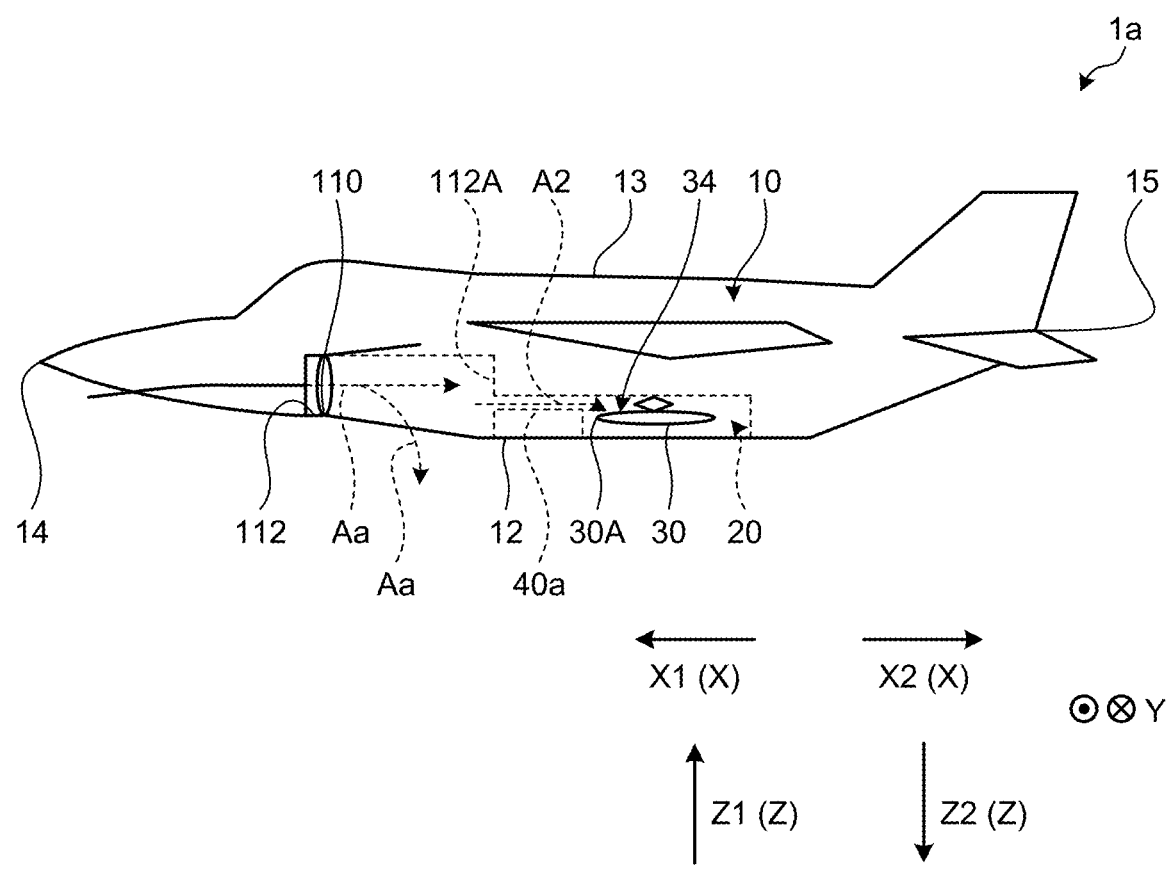
FIG. 9 is a schematic diagram of another example of the gas supply part.

FIG. 9 is a schematic diagram of another example of the gas supply part. In the present embodiment, the airflow A flowing along the bottom face 12 is taken in and is blown to the blowing position 34 on the object to be dropped 30 as the airflow A2. It should be noted that the airflow to be the airflow A2 is not limited to the airflow A flowing along the bottom face 12 as long as it is an airflow near the aircraft 1. The aircraft 1a in FIG. 9 introduces part of an airflow Aa taken in into a diverter 112 into the cavity 20 as the airflow A2, for example.

More specifically, the aircraft 1a in the example in FIG. 9 has an intake duct 110 and the diverter 112. The intake duct 110 is a duct that is provided in the body 10 and takes in air to be taken in by an engine of the aircraft 1a. The diverter 112 is a gap (a space) formed between the body 10 and the intake duct 110 so as to be adjacent to the intake duct 110. In other words, the intake duct 110 is mounted on the body 10 with the diverter 112 in between. The diverter 112 is a groove opening on the bottom face 12 side and the nose 14 side and has a bottom face 112A on the tail 15 side.

The aircraft 1a takes in air from the intake duct 110 while flying. In this case, on the nose 14 side of the intake duct 110, an air flow boundary layer develops near the surface of the body 10. This air flow boundary layer loses energy through friction with the airframe surface, and it is desirable that the boundary layer be not taken in into the intake duct 110. For this reason, the aircraft 1a is provided with the diverter 112 between the airframe surface and the intake duct 110 and takes in this boundary layer into the inside of the diverter 112 from an open part on the nose 14 side as the airflow Aa.

In the example in FIG. 9, a gas supply channel 40a is connected to the diverter 112. The gas supply channel 40a is a channel (hole) connecting the bottom face 112A of the diverter 112 and the cavity 20 to each other. While the airflow Aa taken in into the diverter 112 is discharged from an open part on the bottom face 12 side (passes through) to the outside of the diverter 112, pressure increases near the bottom face 112A of the diverter 112 owing to the air by the airflow Aa. In the example in FIG. 9, the gas supply channel 40a is connected to the bottom face 112A, and this air increased pressure can be taken in and be supplied to the cavity 20 as the airflow A2. The airflow A2 thus taken in from the gas supply channel 40a is blown to the blowing position 34 on the object to be dropped 30 as in the example in FIG. 5, for example. Consequently, even when the airflow Aa from the diverter 112 is used as in FIG. 9, similarly to the example in FIG. 5 using the airflow A, both acoustic vibrations (vibrations of the structural members) and damage due to collision of the head part 30A of the object to be dropped 30 with the airframe can be suppressed. This gas supply channel 40a may be provided with the inlet wall part 46 similarly to the gas supply channel 40 in FIG. 5.

EXAMPLE

The following describes an example of the present embodiment. In the example, a simulation flowing the airflow A was performed using a model provided with the cavity 20, the object to be dropped 30, the gas supply channel 40, the inlet wall part 46, and the outlet wall part 48 according to the present embodiment. As a comparative example, a simulation similar to that of the example was performed using a model provided with the cavity 20X and the object to be dropped 30X. The model of the comparative example is the same as the model of the example except that the gas supply channel 40, the inlet wall part 46, and the outlet wall part 48 are not included.

Figure 10:
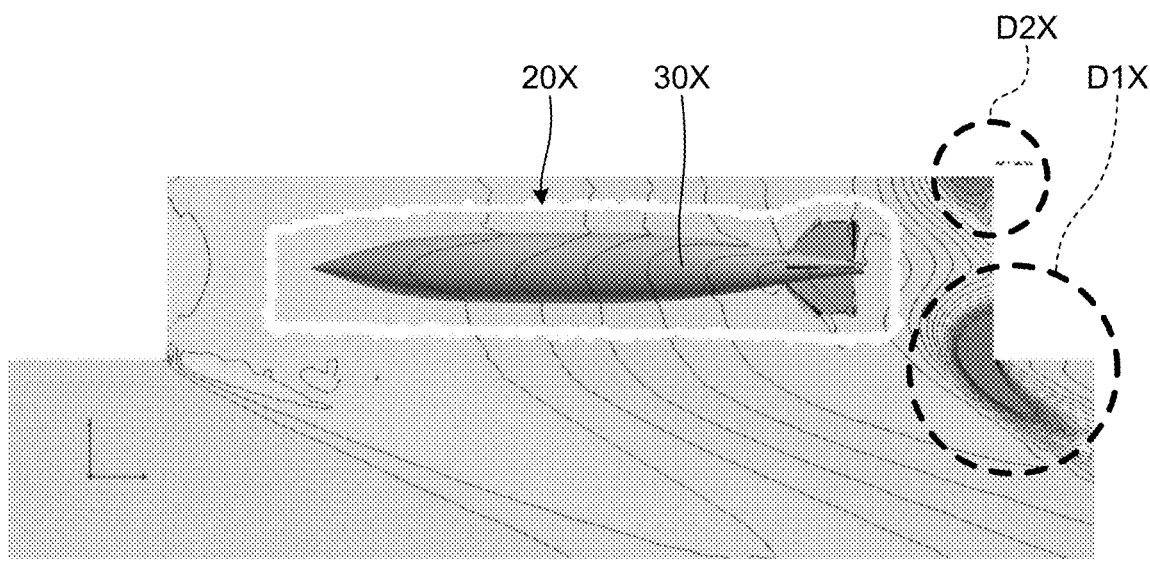
FIG. 10 is a diagram of a simulation result showing pressure distribution.
Figure 10:
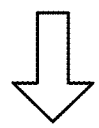
Figure 10:
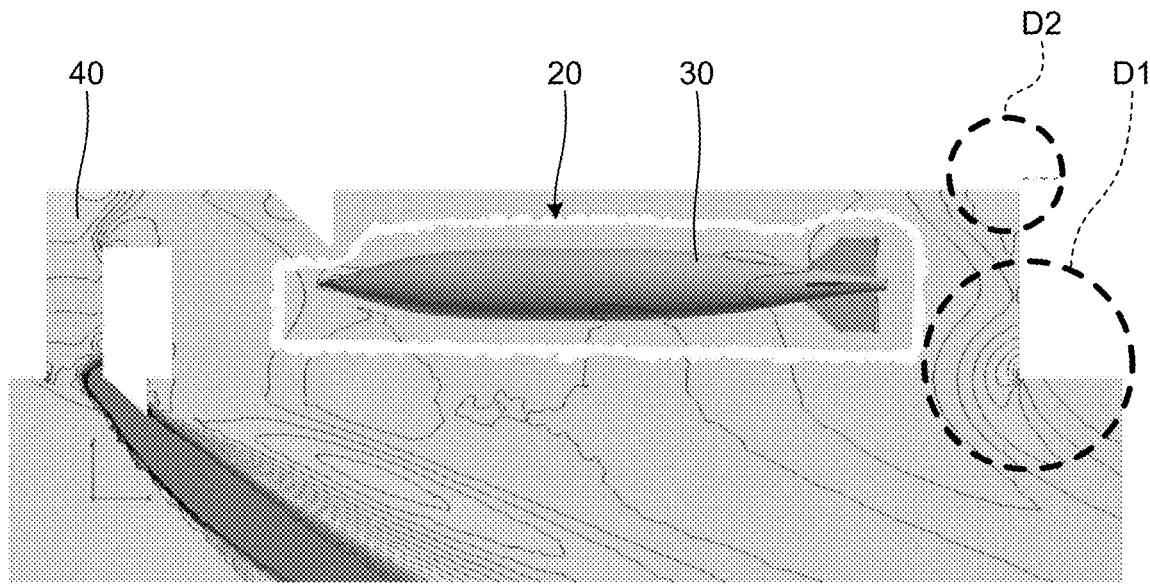

FIG. 10 is a diagram of a simulation result showing pressure distribution. As illustrated in FIG. 10, in the simulation of the comparative example, high-pressure regions occur at a position D1X on the rear end part of the cavity 20X and a region D2X near the rear end part in the cavity 20X. It can be seen that in the comparative example the position D1X is high in pressure, and the shear layer is colliding with the rear end part of the cavity 20X. It can be seen that in the comparative example the position D2X is high in pressure, and the moment lifting the head part of the object to be dropped 30X is strong. In contrast, it can be seen that in the simulation of the example a position D1 on the rear end part of the cavity 20 and a region D2 near the rear end part in the cavity 20 are lower in pressure than the comparative example. Consequently, it can be seen that in the example the collision of the shear layer with the rear end part of the cavity 20 is suppressed, and the moment lifting the head part of the object to be dropped 30 is suppressed. Consequently, it can be seen that from this simulation result damage by the collision of the object to be dropped 30 is suppressed in the example.

Figure 11:
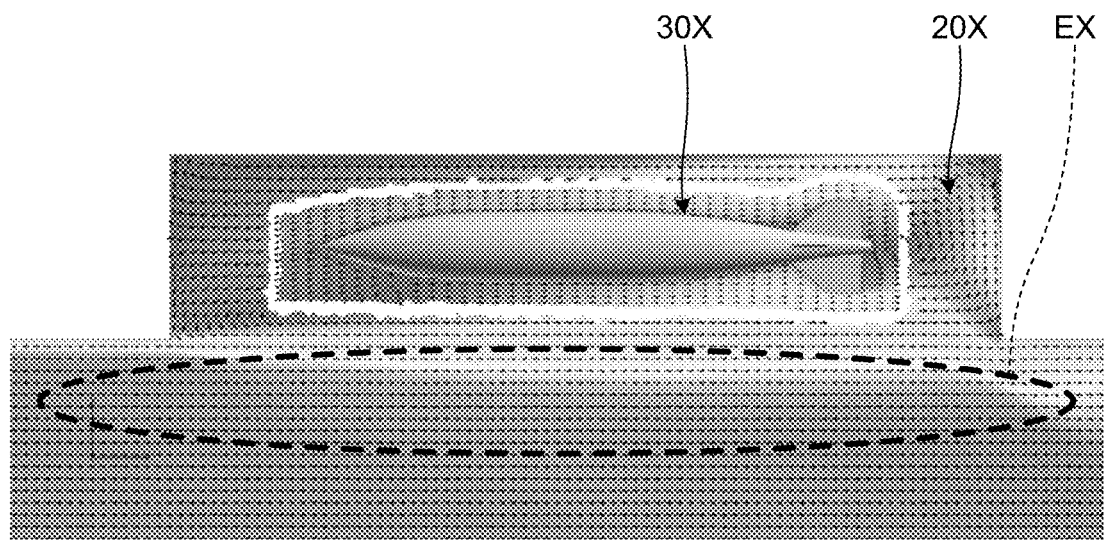
FIG. 11 is a diagram of a simulation result showing velocity distribution.
Figure 11:
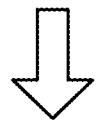
Figure 11:
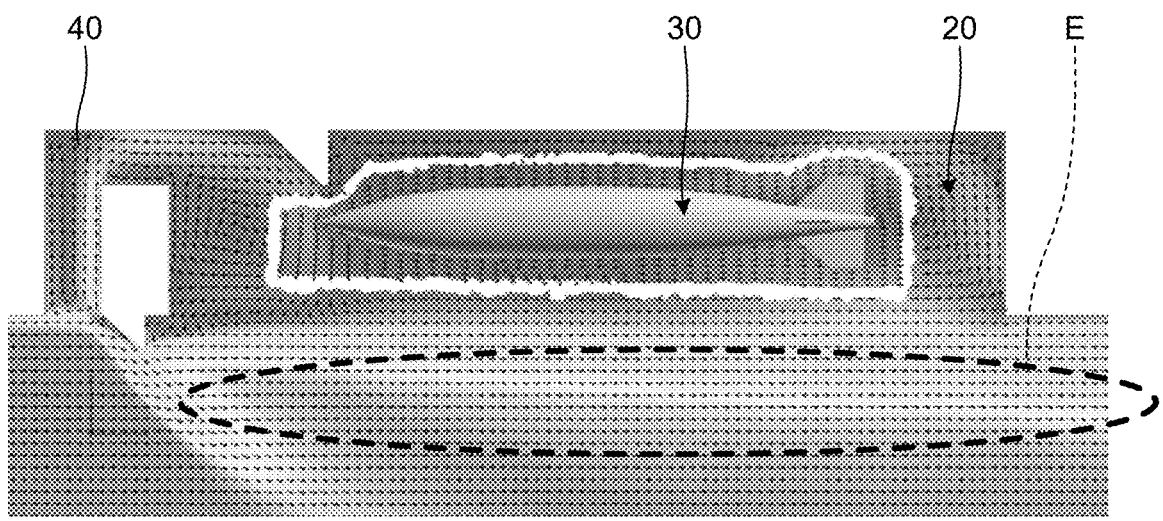

FIG. 11 is a diagram of a simulation result showing velocity distribution. As illustrated in FIG. 11, it can be seen that in the simulation of the comparative example a high-speed shear layer occurs at a position EX along the opening of the cavity 20X. In contrast, it can be seen that in the example a high-speed shear layer occurs at a position E along the opening of the cavity 20. It should be noted that it can be seen that the position E of the example is more distant from the opening of the cavity 20 than the position EX in the comparative example. Consequently, it can be seen that in the example the shear layer S is further pressed down, and vibrations of the structural members (acoustic vibrations) are suppressed.

Figure 12:
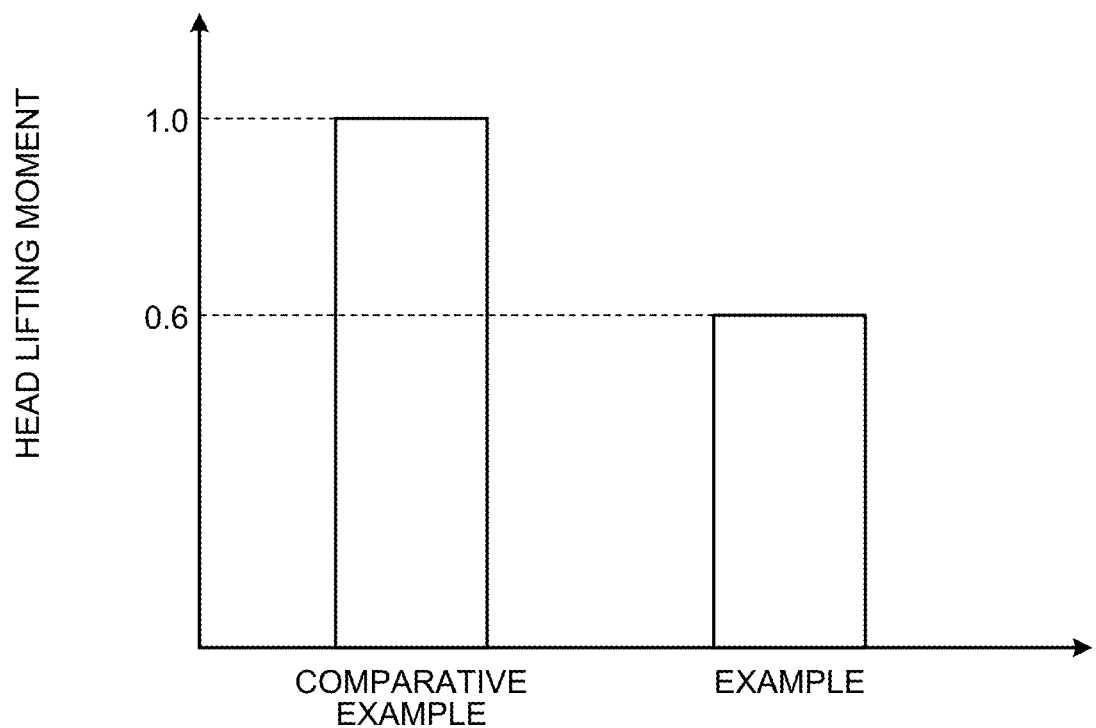
FIG. 12 is a graph comparing a pitching moment.

FIG. 12 is a graph comparing a pitching moment. The vertical axis of FIG. 12 is a pitching moment, that is, a moment pushing up the head part of the object to be dropped vertically upward. This pitching moment is a result obtained by converting values calculated by integrating the pressure distribution in FIG. 10 into a ratio comparing the example to the comparative example. As illustrated in FIG. 12, when the pitching moment in the simulation of the comparative example is set to 1.0, the pitching moment in the simulation of the example is 0.6. Thus, it can be seen that in the example the pitching moment is suppressed to suppress the collision of the head part of the object to be dropped 30.

The aircraft according to the present disclosure is an aircraft capable of dropping an object to be dropped and has a body, a cavity that is provided in the body and opens on the bottom face of the body, and a gas supply part that blows gas from vertically above to a blowing position on the object to be dropped detachably mounted in the cavity, the blowing position being a position on a side closer to the nose of the aircraft with respect to the center of gravity of the object to be dropped.

This aircraft blows the gas to the blowing position and can thereby suppress both vibrations of the structural members by the shear layer hitting the end face on the downstream side of the cavity and damage due to collision of the object to be dropped with the airframe.

When the object to be dropped is dropped vertically downward from the cavity, the gas supply part may blow an airflow having a vertically downward component onto the object to be dropped. This airflow makes the shear layer depart from the airframe and gives a moment in a direction in which the head of the object to be dropped is lowered relative to the tail. Consequently, this aircraft can appropriately suppress vibrations of the structural members by the shear layer hitting the end face on the downstream side of the cavity and damage due to collision of the object to be dropped with the airframe.

The gas supply part may have an inlet opening part open in the bottom face of the body on a side closer to the nose of the aircraft with respect to the cavity, an outlet opening part open in a vertically upper side of the cavity with respect to the object to be dropped in the cavity, and a gas supply channel that communicates the inlet opening part and the outlet opening part with each other, may take in air flowing along the bottom face from the inlet opening part, and may blow, from the outlet opening part, the air taken in onto the object to be dropped. This aircraft can appropriately suppress vibrations of the structural members and damage by collision of the object to be dropped without separately providing an apparatus for blowing gas onto the object to be dropped.

The gas supply part may further have an inlet wall part that is provided between the inlet opening part and the cavity and protrudes from the bottom face of the body. This aircraft can further press down the shear layer, facilitate supply of air to the gas supply part by high pressure generated there, and suppress vibrations of the structural members and collision of the object to be dropped with the airframe more favorably.

The inlet wall part may be openable and closable and may cover the inlet opening part when the inlet wall part is closed, and may open the inlet opening part and protrude from the bottom face of the body when the inlet wall part is open. This aircraft can close the inlet opening part and cause the inlet wall part not to protrude when it is not the timing for the aircraft to drop the object to be dropped, thus a form can be achieved that does not generate useless air resistance.

The gas supply part may further have an outlet wall part that is provided in the cavity, receives the air blown out of the outlet opening part, and flows the received air to the blowing position on the object to be dropped. This aircraft can appropriately blow the air to the blowing position by the outlet wall part and can thus perform vibrations of the structural members and the collision of the object to be dropped with the airframe more appropriately.

While certain embodiments have been described, these embodiments are not intended to limit the scope of the inventions. The components in the embodiments include ones that a person skilled in the art can easily conceive of, ones that are substantially the same, or ones that fall in their equivalents. Furthermore, various omissions, substitutions, combinations, and changes may be made as appropriate to configurations of the components disclosed in the embodiments without departing from the spirit of the inventions.

What is claimed is:

1. An aircraft configured to drop an object, the aircraft comprising:
   a body;
   a cavity defined in the body, the cavity opening on a bottom face of the body; and
   a gas supply part configured to blow gas from vertically above to a blowing position on the object which is detachably mounted in the cavity, the blowing position being a position on a side closer to a nose of the aircraft with respect to a center of gravity of the object,
   wherein the gas supply part has:
   an inlet opening part that opens in the bottom face of the body on a side closer to the nose of the aircraft with respect to the cavity;
   an outlet opening part that opens in a vertically upper side of the cavity with respect to the object in the cavity;
   a gas supply channel connecting the inlet opening part and the outlet opening part with each other, the gas supply part being configured to take in air flowing along the bottom face of the body from the inlet opening part, and blow, from the outlet opening part, the air taken in onto the object; and
   an outlet wall part that is in the cavity and configured to receive the air blown out of the outlet opening part and deflect the air to the blowing position on the object.

2. The aircraft according to claim 1, wherein the gas supply part is configured to blow an airflow having a vertically downward component onto the object when the object is dropped vertically downward from the cavity.

3. The aircraft according to claim 1, wherein the gas supply part further has an inlet wall part that is between the inlet opening part and the cavity, and protrudes from the bottom face of the body.

4. The aircraft according to claim 3, wherein the inlet wall part is openable and closable, covers the inlet opening part when the inlet wall part is closed, and opens the inlet opening part and protrudes from the bottom face of the body when the inlet wall part is open.

* * * * *